US008778294B2

(12) United States Patent
Hansen et al.

(10) Patent No.: US 8,778,294 B2
(45) Date of Patent: Jul. 15, 2014

(54) PROCESS FOR PRODUCTION OF PCC

(75) Inventors: Kaare Hvid Hansen, Humlebæk (DK); Mogens Pedersen, Lille Skensved (DK)

(73) Assignee: Omya Development AG, Oftringen (CH)

( * ) Notice: Subject to any disclaimer, the term of this patent is extended or adjusted under 35 U.S.C. 154(b) by 989 days.

(21) Appl. No.: 12/596,510

(22) PCT Filed: Apr. 17, 2008

(86) PCT No.: PCT/DK2008/050089
§ 371 (c)(1), (2), (4) Date: Feb. 1, 2010

(87) PCT Pub. No.: WO2008/128545
PCT Pub. Date: Oct. 30, 2008

(65) Prior Publication Data
US 2010/0135891 A1    Jun. 3, 2010

Related U.S. Application Data

(60) Provisional application No. 60/912,960, filed on Apr. 20, 2007.

(30) Foreign Application Priority Data

Apr. 20, 2007 (EP) ..................... 07106613

(51) Int. Cl.
*C01F 11/18* (2006.01)
*B01J 4/00* (2006.01)
*B01J 19/18* (2006.01)

(52) U.S. Cl.
CPC ............... *C01F 11/182* (2013.01); *B01J 4/001* (2013.01); *C01P 2004/61* (2013.01); *B01J 19/1881* (2013.01); *C01F 11/18* (2013.01); *C01P 2006/22* (2013.01); *C01P 2006/12* (2013.01)
USPC ........................................ 423/432; 422/234

(58) Field of Classification Search
None
See application file for complete search history.

(56) References Cited

U.S. PATENT DOCUMENTS 5,695,733 A * 12/1997 Kroc et al. .................... 423/432
6,022,517 A    2/2000 Fairchild et al.
(Continued)

FOREIGN PATENT DOCUMENTS

WO    WO 01/66467 A1    9/2001
WO    WO 01/92152 A1    12/2001
(Continued)

*Primary Examiner* — Melvin C Mayes
*Assistant Examiner* — Colin W Slifka
(74) *Attorney, Agent, or Firm* — Knobbe Martens Olson & Bear LLP

(57) ABSTRACT

The present invention relates to a process of preparing precipitated calcium carbonate (PCC) in a low energy intensity reactor in such a manner that the amount of solids in the PCC product can be raised to 35% or more without performing a dewatering step. The process comprises performing in parallel and in two or more separate reaction vessel the steps of contacting calcium hydroxide with a gas comprising carbon dioxide to allow formation of calcium carbonate, and adding calcium oxide, lime or dry calcium hydroxide or a combination of any of the three to a part of the resulting mixture of calcium hydroxide and calcium carbonate. The invention further provides a specialized reactor system as well as the use of this reactor system in the manufacture of PCC.

19 Claims, 8 Drawing Sheets

(56) References Cited

U.S. PATENT DOCUMENTS

| | | | |
|---|---|---|---|
| 6,143,065 A * | 11/2000 | Freeman et al. | 106/464 |
| 6,475,459 B1 | 11/2002 | Virtanen | |
| 6,602,484 B1 | 8/2003 | Virtanen | |
| 6,699,318 B1 | 3/2004 | Virtanen | |
| 6,761,869 B1 | 7/2004 | Virtanen | |
| 2003/0051841 A1 * | 3/2003 | Mathur et al. | 162/181.1 |
| 2003/0059362 A1 * | 3/2003 | Takahashi et al. | 423/432 |

FOREIGN PATENT DOCUMENTS

| | | |
|---|---|---|
| WO | WO 01/92422 A1 | 12/2001 |
| WO | WO 03/106344 A1 | 12/2003 |
| WO | WO 2005/044728 A2 | 5/2005 |
| WO | WO 2005/061386 A1 | 7/2005 |

* cited by examiner

PROCESS FOR PRODUCTION OF PCC

CROSS REFERENCE TO RELATED APPLICATIONS

This application claims the benefit and priority to and is a U.S. National Phase Application of PCT International Application Number PCT/DK2008/050089, filed on Apr. 17, 2008, designating the United States of America and published in the English language, which is an International Application of and claims the benefit of priority to U.S. Provisional Application No. 60/912,960, filed on Apr. 20, 2007, and European Patent Application No. 07106613.8, filed on Apr. 20, 2007. The disclosures of the above-referenced applications are hereby expressly incorporated by reference in their entireties.

TECHNICAL FIELD OF THE INVENTION

The present invention relates to a process for the manufacture of precipitated calcium carbonate in a low energy intensity reactor. In particular the invention provides a process wherein PCC having high dry-matter content is obtained by the addition of unslaked lime or dry calcium hydroxide to the carbonation reaction as an alternative or supplement to slaked lime which is used in conventional processes.

BACKGROUND OF THE INVENTION

Precipitated calcium carbonate is used widely as a mineral pigment or filler in the production of commodities such as paper, toothpaste, paint and plastics and high grade PCC is used in formulations of pharmaceuticals. PCC is produced through a reaction process that utilizes calcium oxide (lime), carbon dioxide and water. This precipitation reaction is capable of producing three distinct polymorphs (calcite, aragonite and vaterite) depending on the exact reaction conditions used. The main commercial types of PCC are acicular aragonite or calcite with the following morphologies: rhombohedral, prismatic, colloidal, acicular and scalenohedral and for each shape it is possible to adjust the aggregation level, particle size, size distribution and surface area by changing the process parameters.

Most commercial PCC carbonation reactions are operated in reactors with a low energy intensity of the mixing (less than 10 kW/m$^3$). Therefore, if a homogeneous solution should be ascertained during carbonation, and thereby also a homogeneous product, a relatively low viscosity of the slaked lime is required (Brookfield viscosity less that 1000, spindle 3 100 rpm). Therefore, most commercial PCC is produced in the carbonation step at a final dry between 12 and 24% solids Because of the low solids further downstream processing (concentration) is needed if the fillers are to be transported over longer distances. Concentration of fillers in industrial scale will normally involve high shear or high pressures giving rise to breakage of some of the PCC particles or PCC aggregates. Breakage of PCC particles frees Ca(OH)$_2$ thereby increasing the pH of the PCC solution. Since commercial PCC solutions are often sold at a pH between 8 and 10 it is often necessary to add a pH stabilising step.

For PCC produced in a conventional low energy intensity reactor, it is possible to increase the solids to reach a dry matter content of approximately 35% dry matter by mechanical dewatering of the carbonated product, such as by centrifugation, decanting or filtration. This will, however, decrease the steepness of the particle size distribution as shown by an increase in the steepness number calculated as the mass amount of the 75% particle size fractile divided with the mass amount of the 25% mass fractile. Analyses performed by the inventors on full scale PCC production show that the 75%/25% mass fractile ratio may increase from 1.5 to 2.0. Furthermore a secondary pH stabilising step is avoided.

Several processes for PCC precipitation have been described in the art in which PCC with high dry matter content is produced in processes involving the use of unslaked lime: U.S. Pat. No. 6,761,869, U.S. Pat. No. 6,602,484, U.S. Pat. No. 6,699,318, U.S. Pat. No. 6,475,459 and WO 03/106344 all provide processes involving carbonation of unslaked lime or processes in which the steps of slaking and carbonation are combined. In each case, however, the process requires high energy intensity, high pressure and/or the use of large gas volumes which makes the processes unsuitable for manufacturing PCC in large scale and at a reasonable cost. Furthermore, these processes cannot be used in the manufacture of all the commercially important PCC morphologies mentioned above.

Other specialised processes for the manufacture of particular PCC morphologies are available: U.S. Pat. No. 5,695,733 provides a process for converting aggregated scalenohedral PCC to aggregated rhombohedral PCC by controlling conductivity during the reaction and U.S. Pat. No. 6,022,517 describes a process for the manufacture of acicular calcite or aragonite calcium carbonate having clusters of rod shaped or needle-shaped acicular crystals by carbonation of calcium hydroxide or calcium oxide in the presence of water-soluble aluminium compounds. While these processes may involve carbonation of unslaked lime, they do not address the need for an efficient and economical process suitable for production of all commercially important PCC morphologies.

Finally, when unslaked lime is used in the processes reviewed above, it is suggested to add the unslaked lime directly into the carbonation reactor. In a conventional low energy reactor, however, addition of unslaked lime directly into the reactor is problematic as there is a relatively large flow of gas through the reactor. The gas is saturated with water and since lime is hygroscopic the gas flow results in settlement of lime on the various equipment parts leading to dysfunction of mechanical parties in the reactor and to the formation of non-uniform products. Furthermore, lime added directly to a carbonation reactor might give rise to large calcium concentrations at the addition point. This might cause seeding and thereby a broader particle size of the final product.

Hence, an improved process for the manufacture of uniform precipitated calcium carbonate in a low energy intensity reactor and at high solids would be advantageous for practical and economic reasons. In particular, it would be desirable to devise a principle for increasing the solids in carbonation reactions that can be used in the preparation of all commercially relevant PCC morphologies.

SUMMARY OF THE INVENTION

Thus, it is an objective of the present invention to provide an efficient and cost-effective method for production of acicular aragonite and calcite with the following morphologies: prismatic, rhombohedral, colloidal and scalenohedral PCC at high solids. In particular, it is an object of the present invention to provide a process that solves the above mentioned problems arising when unslaked lime is added directly into the carbonation reactor.

In accordance herewith, a process has been devised, which allows production of PCC in a commercial low energy intensity carbonation reactor, where the limit for the final PCC solids is the product viscosity (limited by CO$_2$ up-take, mixing, pumpability etc) and not limited by viscosity of the raw material (a calcium hydroxide solution). If nothing is added to reduce viscosity (dispersing aids or other) then PCC can be produced at solids up to at least 40%. If dispersing agents or similar is added, then it is possible to reach 75%.

Thus, one aspect of the invention relates to a process for production of precipitated calcium carbonate by carbonation of calcium hydroxide, comprising performing in parallel and in two or more separate reaction vessels the steps of:
i) contacting calcium hydroxide with a gas comprising carbon dioxide to allow formation of calcium carbonate, and
ii) adding calcium oxide, lime or dry calcium hydroxide or a combination of any of the three to a part of the resulting mixture of calcium hydroxide and calcium carbonate;
in such a way that continuous or non-continuous circulation between the two or more reaction vessels are allowed.

Another aspect of the present invention relates to a reactor system comprising:
a) optionally a water inlet,
b) a gas inlet, and
c) a recirculation loop, comprising an inlet for addition of lime, calcium oxide, dry calcium hydroxide or a combination of any of the three and, optionally, a water inlet.

Yet another aspect of the present invention is to provide the use of a reactor system according to the invention for the production of precipitated calcium carbonate.

The present invention will now be described in more detail in the following.

DETAILED DESCRIPTION OF THE INVENTION

Definitions

Prior to discussing the present invention in further details, the following terms and conventions will first be defined:

When used in the present context the term "Calcium oxide" refers to matter which is 100% CaO.

The term "Dry calcium hydroxide" on the other hand refers to matter which is 80-100% $Ca(OH)_2$ and 0-20% water In relation to the present invention the term "lime" is used in its conventional meaning referring to a mixture of calcium oxide, calcium hydroxide, calcium carbonate and impurities like sand, stone, iron, magnesium oxide, heavy metals etc, where the calcium oxide normally exceeds 80% of the content by weight, calcium hydroxide content is normally less than 5%, calcium carbonate is normally less that 10% and impurities are normally less than 10%

Figure 1:
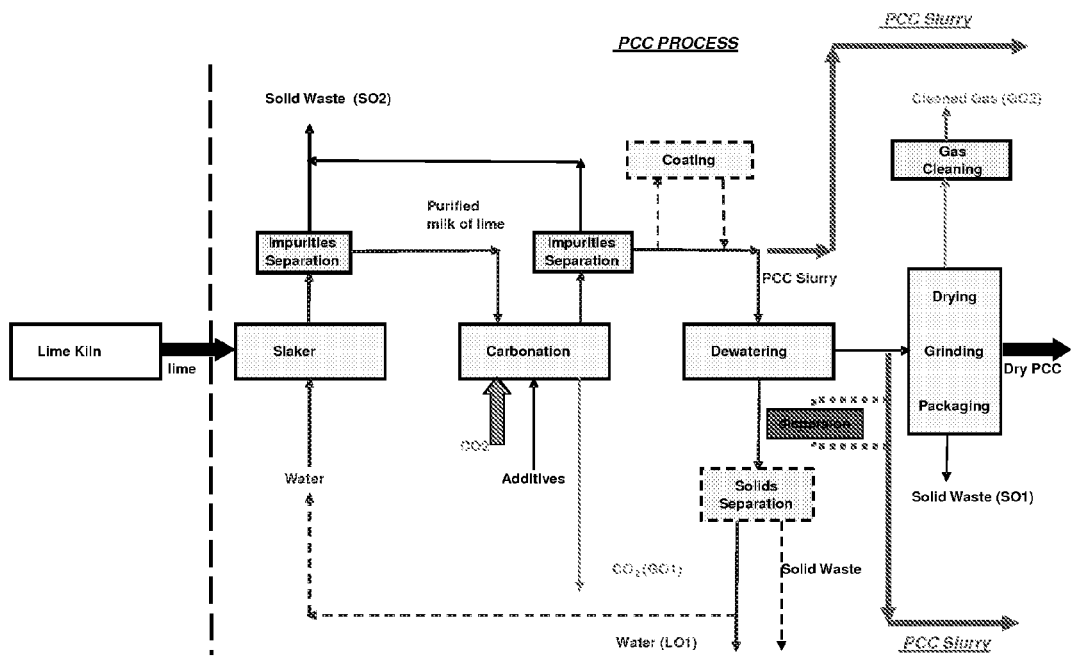
FIG. 1: Overview of the PCC process from the Calcium carbonate association Europe, PCC task force meeting Oct. 5, 2004.
Figure 2:
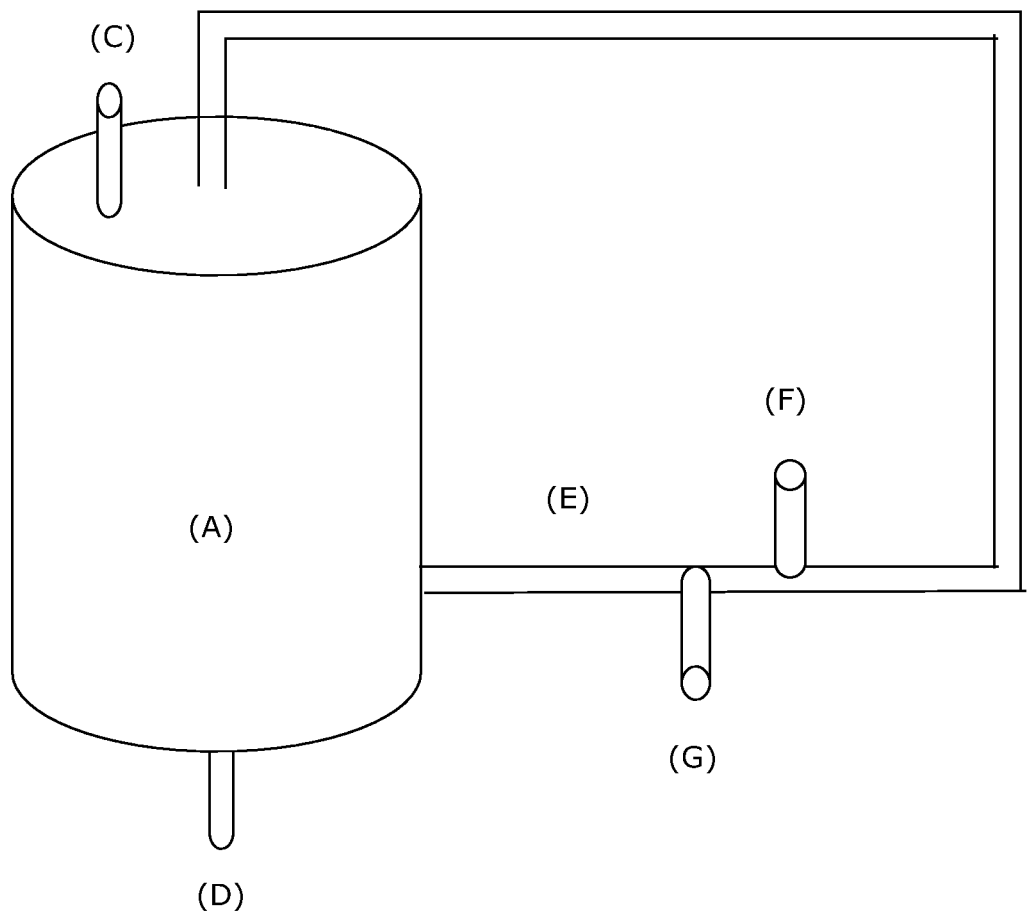
FIG. 2: Schematic presentation of a reactor system according to the invention comprising a first or main reaction vessel (A), optionally a water inlet (C), a gas inlet (D), and a recirculation loop (E), comprising an inlet for addition of calcium oxide, lime, dry calcium hydroxide or a combination of any of the three (F) and, optionally, a water inlet (G).
Figure 3:
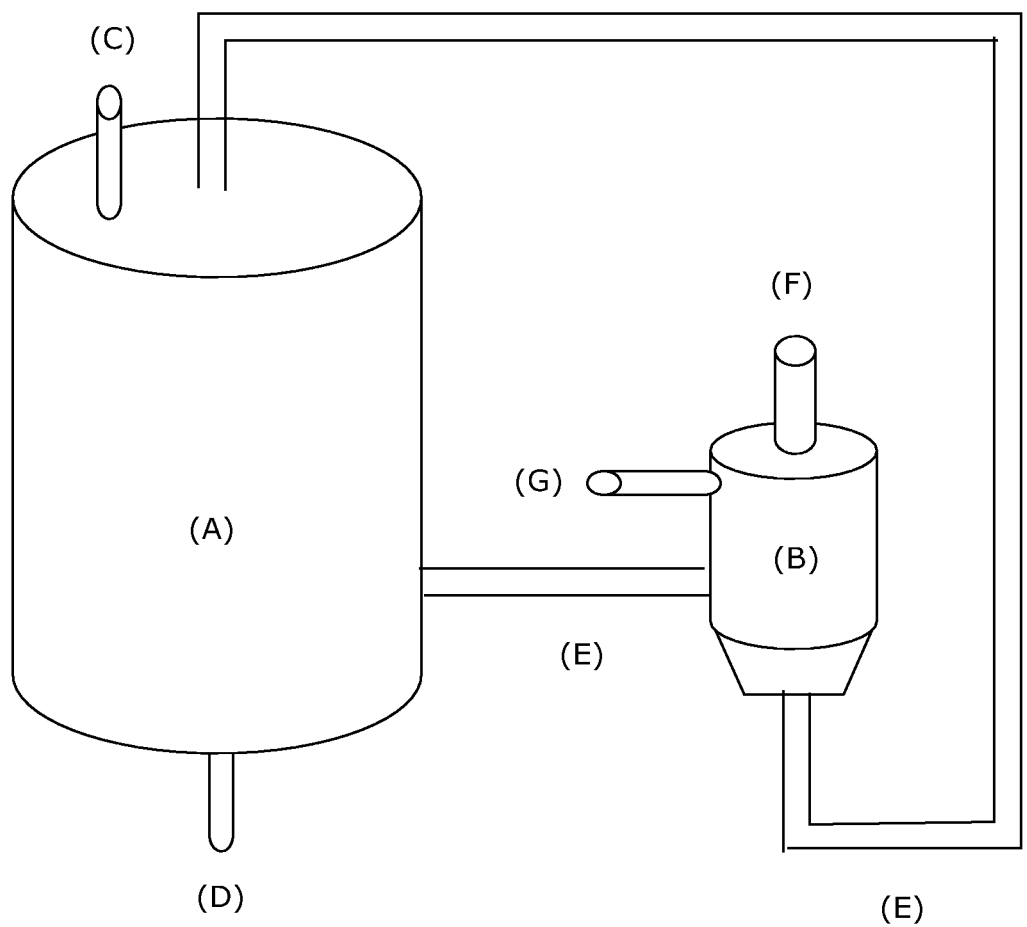
FIG. 3: Schematic presentation of a reactor system according to the invention comprising a first or main reaction vessel (A), a second reaction vessel (B), optionally a water inlet (C), a gas inlet (D), and a recirculation loop (E), comprising an inlet for addition of calcium oxide, lime, dry calcium hydroxide or a combination of any of the three (F) and, optionally, a water inlet (G).
Figure 4:
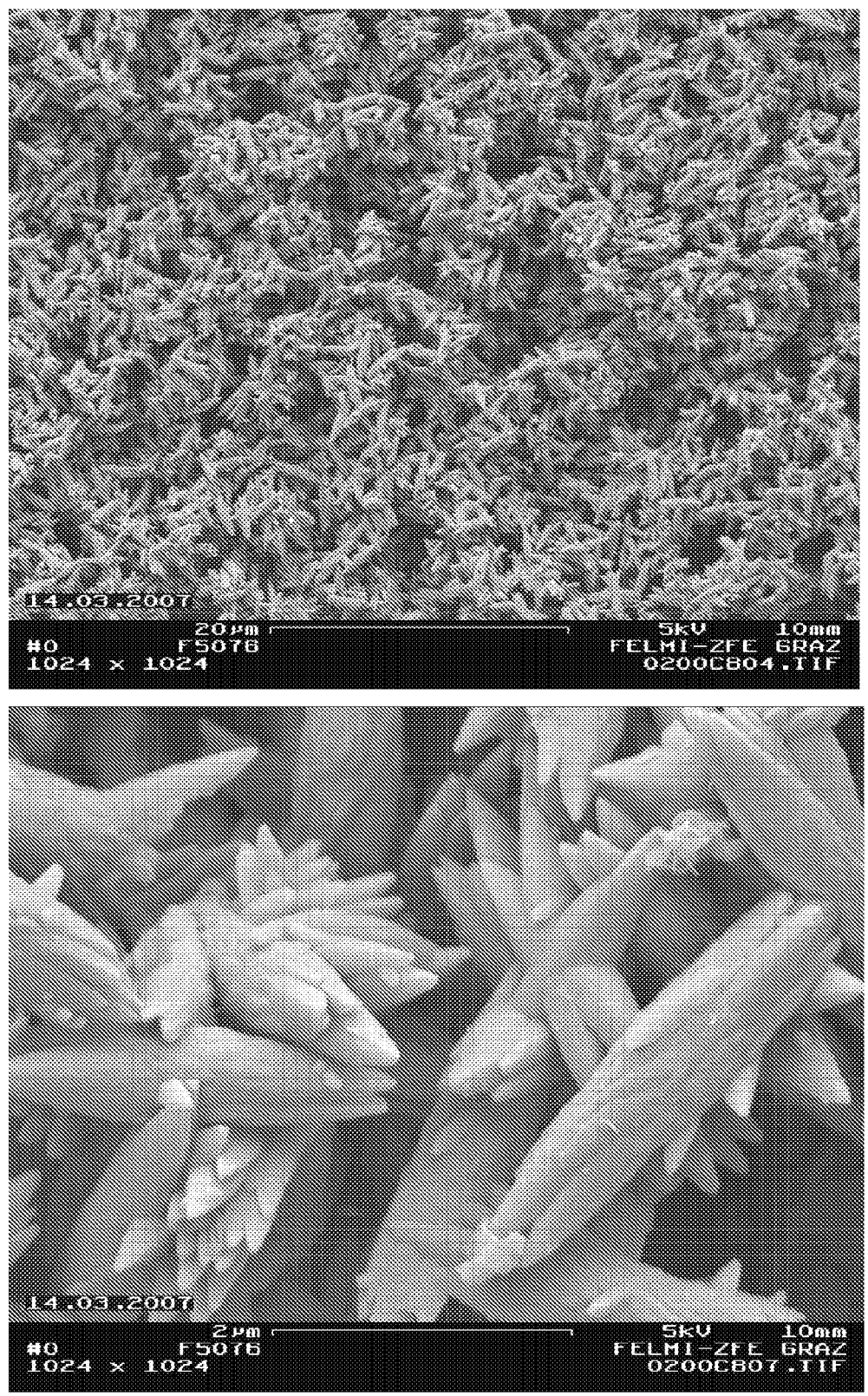
FIG. 4: SEM picture of Schalenohedral PCC as prepared in Example 1.
Figure 5:
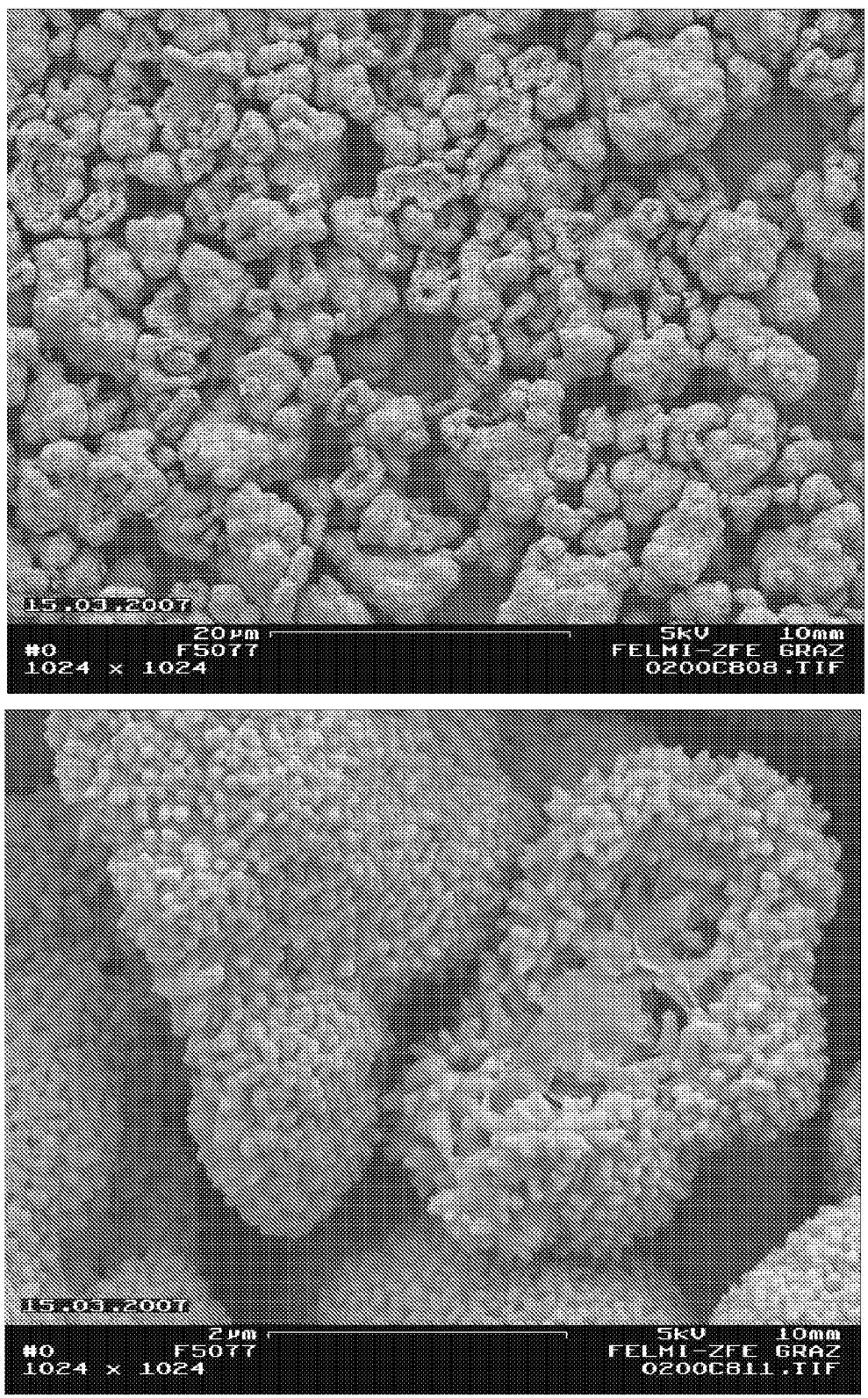
FIG. 5: SEM picture of a colloidal PCC product as prepared in Example 2.
Figure 6:
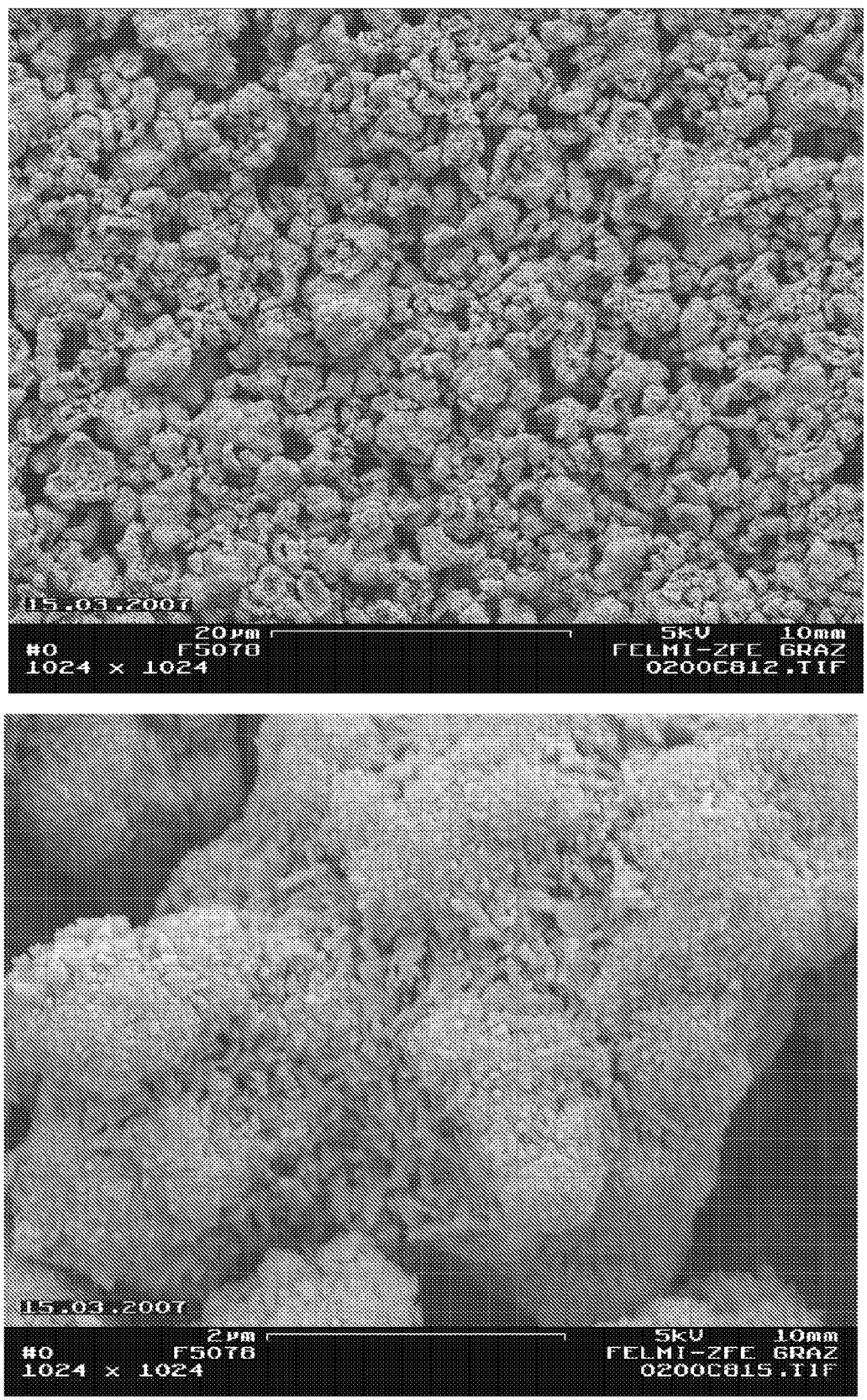
FIG. 6: SEM picture of a colloidal PCC product as prepared in Example 3.
Figure 7:
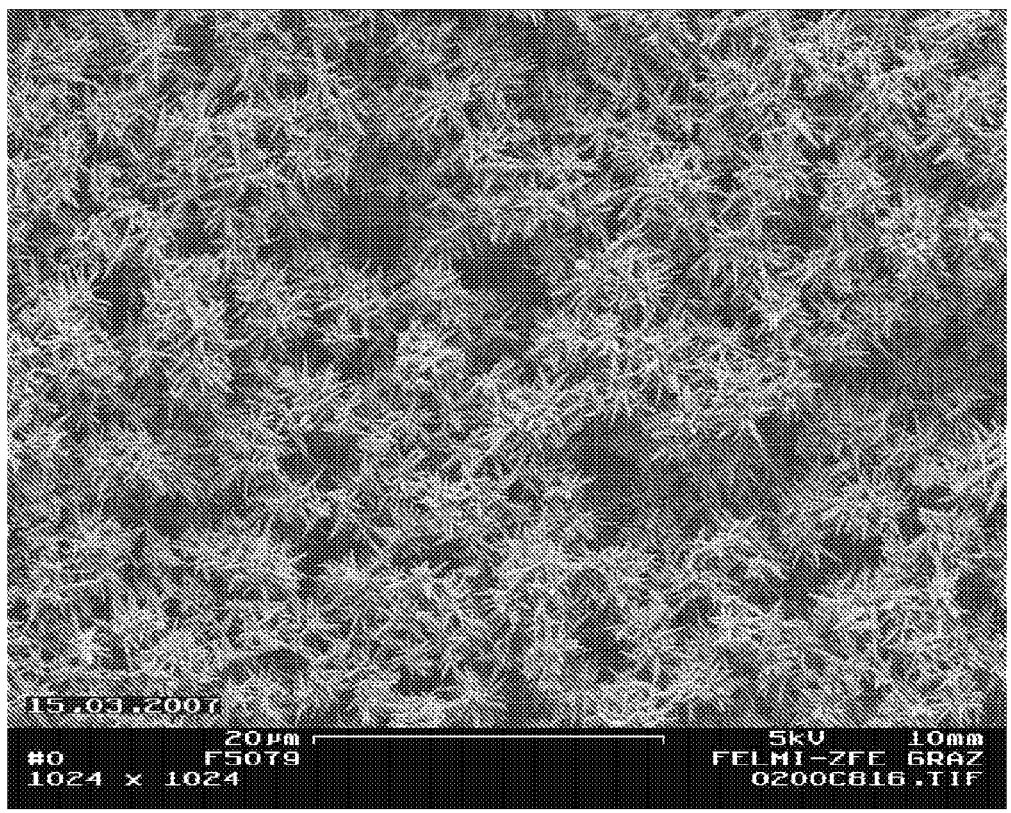
FIG. 7: SEM picture of aggregated aragonite PCC as prepared in Example 4.
Figure 7:
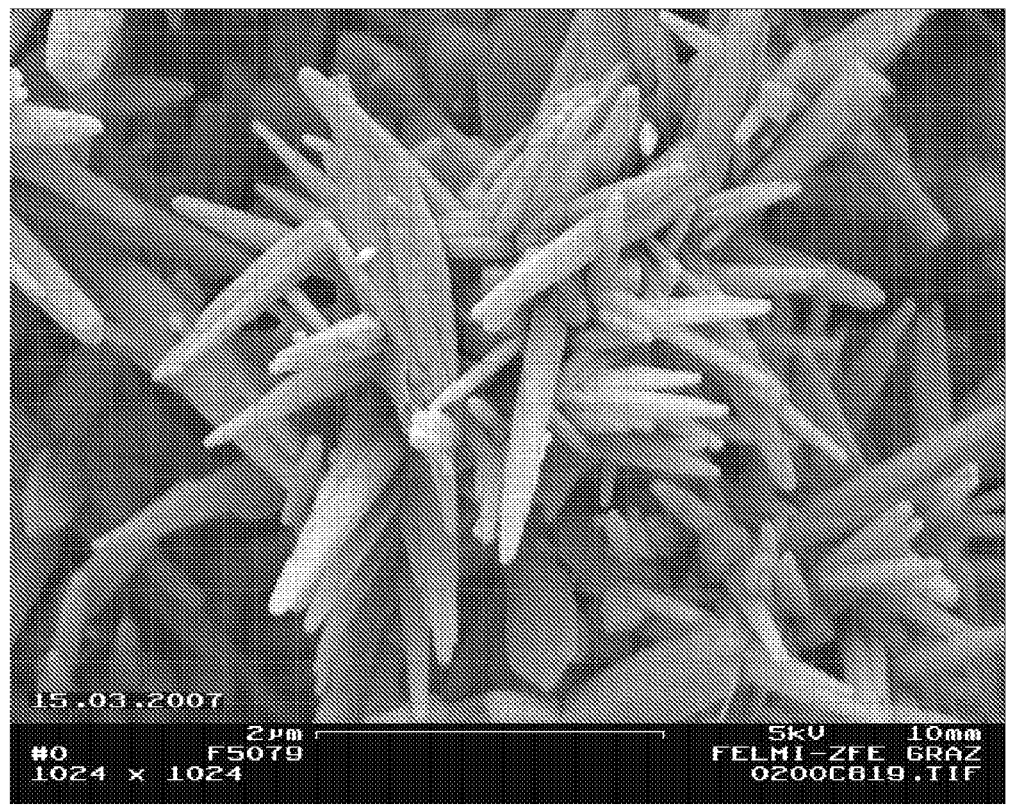
Figure 8:
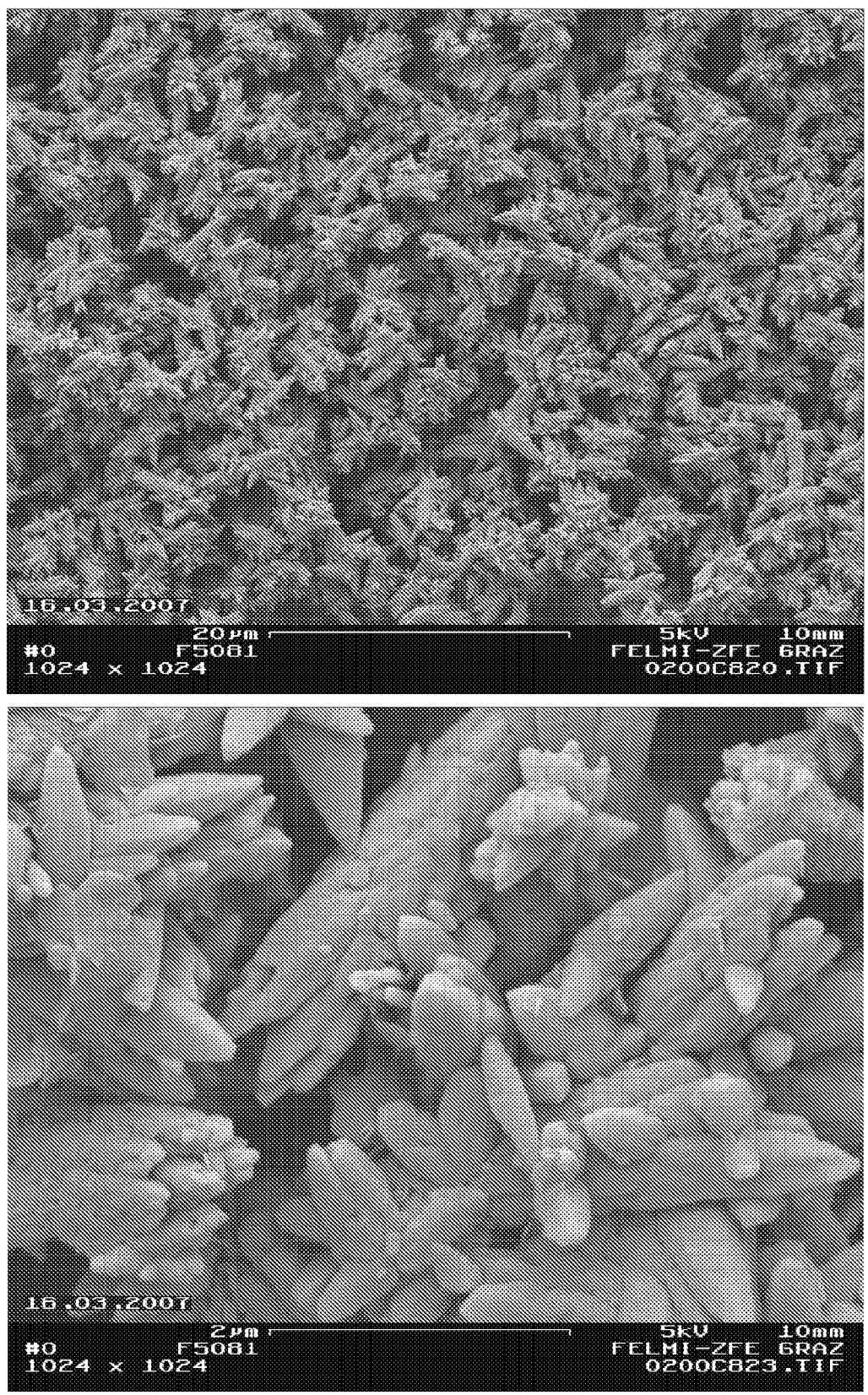
FIG. 8: SEM picture of discrete rhombohedral PCC as prepared in Example 5.

A first aspect of the invention provides a process for production of precipitated calcium carbonate by carbonation of calcium hydroxide, comprising performing in parallel and in two or more separate reaction vessels the steps of:
i) contacting calcium hydroxide with a gas comprising carbon dioxide to allow formation of calcium carbonate, and
ii) adding calcium oxide, lime or dry calcium hydroxide or a combination of any of the three to a part of the resulting mixture of calcium hydroxide and calcium carbonate;
in such a way that continuous or non-continuous circulation between the two or more reaction vessels are allowed, see also FIG. 2.

The previously suggested processes for precipitation of calcium carbonate involving the use of lime are essentially one-step reactions in which lime is added directly to the carbonation reaction. In the process according to the invention, however, precipitation of calcium carbonate is performed as a two-step process: In a first reaction vessel, an amount of calcium hydroxide is contacted with a gas comprising carbon dioxide whereby the formation of calcium carbonate is allowed. In order to facilitate addition of lime and/or calcium hydroxide a part or aliquot of the reaction mixture in the first reaction vessel is then transferred to a separate or second reaction vessel. Subsequently, when calcium oxide, lime or dry calcium oxide or a combination of any of the three has been added, the part or aliquot of the reaction mixture is transferred back into the first reaction vessel and is thereby combined with the ongoing carbonation reaction.

In this two-step process it is possible to add lime or calcium hydroxide at solids above 80% without encountering any of the problems associated with the prior art processes. In particular problems relating to dusting and the depositing of lime or calcium hydroxide within the carbonation reactor are avoided. Moreover, the process of the invention makes it possible to increase the dry matter in the carbonation reactor from approximately 20% to 40% and further up to 45%, 50%, 55%, 60%, 65%, 70% or 75% without increasing the viscosity and without causing undesired alterations of the product morphology. This makes it possible to produce the main commercial types of PCC, acicular aragonite or calcite with the following morphologies: rhombohedral, prismatic, colloidal, acicular and scalenohedral, directly in a conventional reactor at a dry matter of up to 75%.

Further advantages of the present invention relates to the economical aspects of associated with PCC production in industrial scale. In this regard, the process according to the invention offers the possibility to commercially utilize more lime sources than is possible today. In addition, the inventor's analyses have shown that by implementing the process of the present invention it is possible at the same time to increase existing plant capacity and to reduce variable manufacturing costs. The reduction in manufacturing costs arises by the following 5 actions:
process water consumption is reduced
increase ability to use limes that are generally considered difficult to process like lime with a very high or very low reactivity or lime with a high fraction of hard burned material.
electricity consumption is reduced, partly due to a reduction of the water that is needed to be transported and partly due to a capacity increase lime consumption is reduced since the loss of the CaO and Ca(OH)$_2$ added to the carbonation will virtually be zero cooling water consumption is normally reduced The increase in capacity stems from increasing the batch size, while keeping the unproductive sequences in the precipitation process constant like emptying, filling and washing. These processes often comprise a substantial part of a reactor cyclus today. Increased density of the PCC solution will also increase the CO$_2$ up-take slightly giving rise to an increased capacity.

In the process according to the invention lime or dry calcium hydroxide or a combination of the two is added to a part or aliquot of the carbonation reaction as a means for increasing the dry matter. From a process point of view, however, the following items need to be taken into consideration:

1. Calcium hydroxide releases water when it reacts with CO$_2$; this release comprises roughly 1 m$^3$/5.5 tonne dry PCC. This means that the filling level would have to lowered by roughly 1 m$^3$ if dry Ca(OH)$_2$ is used.
2. A separate storage system is needed if both lime and calcium hydroxide are to be used.

As a consequence, for most purposes the use of lime, such as unslaked lime, is currently preferred over the use of calcium oxide and dry calcium hydroxide and combinations of calcium oxide, lime and/or dry calcium hydroxide.

In the simplest embodiments this circulatory process is performed manually by repeatedly taking out aliquots of the carbonation reaction and adding the lime and/or calcium hydroxide to the aliquots before recombining the aliquots with the carbonation reaction. For most industrial purposes, however, it will be convenient to establish a permanent connection between the two or more reaction vessels which will supersede manually handling of aliquots of the carbonation reaction. The connection may be established in the form of tubes and/or hoses.

According to one embodiment of the invention the calcium oxide, lime or dry calcium hydroxide or said combination of any of the three is added to the carbonation reaction in process step i) via a recirculation loop. In this embodiment steps i) and ii) are performed in reaction vessels that are interconnected via a recirculation loop. It will be understood that, in this embodiment, there is a flow of the reaction mixture out of the first reaction vessel, past at least an inlet for addition of calcium oxide, lime or dry calcium hydroxide or a combination of any of the three and, and back into the first reaction vessel. It is further to be understood that the flow through this recirculation loop may occur continuously during the entire carbonation reaction or during the main part of the carbonation reaction. Alternatively, the flow may be suspended for one or more periods whenever needed, such as when needed in order to control reaction conditions of the carbonation reaction.

The process according to the invention provides a particular advantage in eliminating the need for dewatering capacity since it offers the possibility of manufacturing PCC at high solids without the use of a dewatering step. Apart from convenience associated with eliminating the dewatering step, an enhancement of product quality will arise, since if the product is produced e.g. at 35% directly in the reactor, it will possess a considerably steeper size distribution than a dewatered product. For conventional aggregated PCC the size distribution calculated as 75/25 fractile mass ratio is in the range of 1.40 to 1.65. Dewatering to 35% solids in a regular decanter typically leads to an increase in the 75/25 fractile mass ratio of 0.1-0.2, while a lower ratio of 1.30-1.55 is obtained when using the method according to the invention. In the art, a high-steepness filler product is known to have a better optical performance as compared to a low-steepness filler. According to a particular embodiment of the invention, therefore, the process does not involve a dewatering step to obtain the desired precipitated calcium carbonate or precipitated calcium carbonate solution.

The actual amount of calcium oxide, lime or calcium hydroxide or the combination of any of the three which is added will depend on which particular PCC product is desired. For the purpose of the present invention, therefore, the calcium oxide, lime or calcium hydroxide or the combination of any of the three may be added in amounts sufficient to provide as a final product, a slurry containing from 10-75% (W/W) of dry matter (precipitated calcium carbonate), such as a slurry containing from 10-70% (W/W), such as from 10-65% (W/W), from 10-60% (W/W), from 10-55% (W/W), from 10-50% (W/W), from 10-45% (W/W), from 15-45% (W/W), from 20-45% (W/W), from 25-45% (W/W), from 25-40% (W/W), from 27-38% (W/W), from 27-33% (W/W), or such as from 30-38% (W/W) without performing a step of de-watering.

In the process according to the invention the carbonation reaction may be started at a temperature between 5 and 100° C., such as at a temperature between 5 and 60° C., such as at a temperature between 15 and 80° C., or such as a temperature between 20 and 85° C. Particular ranges of preferred starting temperatures will apply depending on the characteristics of the desired product. Generally, cool temperatures during addition of the CO$_2$ tend to produce rhombohedral PCC particles. Warmer temperatures during addition of the CO$_2$ tend to produce scalenohedral PCC particles. In particular, it will be appropriate to use a starting temperature between 5 and 20° C. if the desired product is discrete rhombohedral PCC. Alternatively, when the desired product is aggregated scalenohedral PCC or discrete aragonite PCC, it will be appropriate to use a starting temperature between 30 and 60° C. If the process is performed for the purpose of making colloidal PCC, a starting temperature between 10 and 50° C. may be used.

General directions for the preparation of various PCC morphologies, including a description of the various reaction parameters, are found in the literature, see for instance WO 01/92422 A1 and WO 01/66467 A1. Production of PCC having an acicular calcite morphology is described in U.S. Pat. No. 6,022,517 while the manufacture of PCC with a prismatic calcite morphology is provided in U.S. Pat. No. 5,695,733.

In a particular embodiment of the invention the process is used for the manufacture of colloidal PCC. According to this embodiment, the carbonation reaction in process step i) is started at a temperature from 10-60° C., preferably at a temperature from 10-50° C., and the calcium oxide, lime or calcium hydroxide or the combination of any of the three is added in amounts sufficient to provide, as a final product, a slurry containing from 30-55% (W/W) of precipitated calcium carbonate crystals having a colloidal calcite morphology such as from 30-35% (W/W) precipitated calcium carbonate having a colloidal calcite morphology.

In a second particular embodiment the process is performed with the purpose of producing discrete rhombohedral PCC. Therefore, the carbonation reaction in process step i) is started at a temperature from 5-20° C. and the calcium oxide, lime or calcium hydroxide or the combination of any of the three is added in amounts sufficient to provide as a final product, a slurry containing from 27-35% (W/W) of precipitated calcium carbonate crystals having rhombohedral calcite morphology.

In a further embodiment the carbonation reaction in process step i) is started at a temperature from 15-60° C. and the calcium oxide, lime or calcium hydroxide or the combination of any of the three is added in amounts sufficient to provide as a final product, a slurry containing from 30-55% (W/W) of precipitated calcium carbonate crystals having aggregated Scalenohedral calcite morphology.

In other embodiments the carbonation reaction in process step i) is started at a temperature from 25-60° C. and the lime, calcium oxide or the calcium hydroxide or the combination of any of the three is added in amounts sufficient to provide as a final product, a slurry containing from 30-55% (W/W) of precipitated calcium carbonate crystals having an acicular calcite morphology In still other embodiments the carbonation reaction in process step i) is started at a temperature from 5-30° C. and the calcium oxide, lime or calcium hydroxide or the combination of any of the three is added in amounts sufficient to provide as a final product, a slurry containing from 30-55% (W/W) of precipitated calcium carbonate crystals having a discrete prismatic calcite morphology.

In yet a further embodiment, the carbonation reaction in process step i) is started at a temperature from 30-80° C. and the calcium oxide, lime or dry calcium hydroxide or the combination of any of the three is added in amounts sufficient to provide as a final product, a slurry containing from 10-45% (W/W) of aragonite precipitated calcium carbonate crystals.

In order to fully exploit the potential of the process according to the invention it is preferred that the calcium oxide, lime or dry calcium hydroxide or said combination of any of the three has a high content of solids. For particular purposes a content of solids of 75% or more may be preferred, such as a content of solids of 80% or more, of 85% or more, of 90% or more, 95% or more, 96% or more, 97% or more, 98% or more, or such as a content of solids of 99% or more.

A convenient approach to generating circulation between the two or more reaction vessels used in the process is to ensure that there is a free overflow from the reaction vessel of step i) into the reaction vessel of step ii). Such a set-up is illustrated in FIG. 2a of the present application. In the system illustrated in the figure the carbonation reaction occurs in reaction vessel (A) whereas addition of calcium oxide, lime or dry calcium hydroxide or a combination of any of the three occurs in reaction vessel (B). Free overflow from reaction vessel A) is ensured by mounting the tube or hose part (C) onto the lower third of reaction vessel (A).

For certain applications of the process it may be desired to provide either cooling or heating during the carbonation reaction. In the context of the present invention a convenient way of obtaining cooling or heating is to equip the above described recirculation loop with a cooling device, a heat exchanging device or a heating device.

Known processes for preparation of PCC at high solids needing large energy input are performed in reactors having a size of 1 m$^3$ or less. The process according to the invention may be used for laboratory purposes and in relatively small systems as well as for large industrial size manufacturing and, typically, the skilled person will aim at using reactors having a volume which is considerably larger than that of a typical high energy intensity reactor. Accordingly, the reaction vessel of step i) in the process and the reaction vessel (A) in drawings 2 and 3 preferably has a volume of 2 m$^3$ or more, such as of 3 m$^3$ or more, 4 m$^3$ or more, 5 m$^3$ or more, 10 m$^3$ or more, 15 m$^3$ or more, 20 m$^3$ or more, 25 m$^3$ or more, 30 m$^3$ or more, 35 m$^3$ or more, 40 m$^3$ or more, 45 m$^3$ or more, 50 m$^3$ or more, 60 m$^3$ or more, 70 m$^3$ or more, 80 m$^3$ or more, 90 m$^3$ or more, 100 m$^3$ or more, 125 m$^3$ or more, or such as a volume of 150 m$^3$ or more.

Likewise, it may be preferred that the reaction vessel of step i) in the process and the reaction vessel (A) in drawings 2 and 3 has a volume ranging from 1-70 m$^3$, such as from 2-70 m$^3$, from 3-70 m$^3$, from 4-70 m$^3$, from 5-70 m$^3$, from 7-70 m$^3$, from 10-80 m$^3$, from 15-90 m$^3$, from 20-95 m$^3$, from 25-100 m$^3$, from 30-110 m$^3$, from 40-125 m$^3$, or such as from 40-150 m$^3$.

Since the lime, calcium oxide or dry calcium hydroxide or the combination of any of the three is to be added by initially mixing it with a small portion of the carbonation reaction, it is preferred for the sake of convenience that the reaction vessel of step ii) and the reaction vessel (B) of drawing 3 has an active volume which is considerable smaller than that of the reaction vessel of step i) in the process and the reaction vessel (A) in drawing 3. In particular a volume of 50 liters or more may be preferred for the reaction vessel of step ii), such as of 100 liters or more, of 250 liters or more, of 500 liters or more, of 200 liters or more, of 750 liters or more, of 1000 liters or more, of 2000 liters or more, of 3000 liters or more, of 4000 liters or more, such as of 5000 liters or more.

Likewise, it may be preferred that the reaction vessel of step ii) in the process and the reaction vessel (B) in drawing 3 has a volume of 50-1000 liters, such as 75-1000 liters, 100-1000 liters, 150-1000 liters, 200-1000 liters, 250-1000 liters, 300-1000 liters, 350-1000 liters, 400-1000 liters, 450-1000 liters, or such as a volume of 500-1000 liters.

While it is to be understood that a gas consisting solely of carbon dioxide may be used in process step i) according to the invention it will be understood that the carbon dioxide content of said gas may very depending on the source and the purpose. Accordingly, the gas comprising carbon dioxide in process step i) may for instance have a carbon dioxide content of 5-35%, such as 5-30%, or 10-25%, or a carbon dioxide content of 70-100%, 75-100%, 80-100%, 90-100% or such as 95-100%. In particular illustrative embodiments of the invention which are included in the present application as examples, a gas comprising 15-25% carbon dioxide has been used.

Further the skilled person will understand that it is possible to control the rate of precipitation by varying the rate at which carbon dioxide is supplied to the carbonation reaction. In particular embodiments of the invention the carbon dioxide in step i) of the process is added at a rate corresponding to a gas volume per reactor volume per minute of from 2-8, such as from 2.2-4.8, or from 2.3-4.5 or from 2.4-4.3 or from 2.5-4.1 or such as from 2.6-3.9.

For most purposes it will be preferred that the calcium oxide and/or the dry calcium hydroxide added in the process of the invention, and/or the calcium hydroxide has a particle size of 15 mm or less, such as of 12 mm or less, of 10 mm or less, of 9 mm or less or of 8 mm or less.

In order to obtain a PCC product with solids content up to 75%, it may be necessary to add one or more components having the ability of lowering the viscosity in the reaction and in the final product, said components optionally being selected from the group consisting of: dispersing agents like anionic polymers and calcium salts. These components could be added either prior to reaction or during reaction at any place in the reaction system.

As opposed to previously known processes for preparation of PCC with high solids the process according to the invention uses energy at low intensity. It is therefore a characteristic of the process that the content of said reaction vessels may be adequately mixed using an energy intensity of 50 kW/m$^3$ or less, preferably of 40 kW/m$^3$, such as of 30 kW/m$^3$ or less, 20 kW/m$^3$ or less, 15 kW/m$^3$ or less, 10 kW/m$^3$ or less, 9 kW/m$^3$ or less, 8 kW/m$^3$ or less, 7 kW/m$^3$ or less, 6 kW/m$^3$ or less, 5 kW/m³ or less, 4 kW/m³ or less, 3 kW/m³ or less or such as 2 kW/m³ or less. With regard to the energy intensity the applicant runs the process according to the inventions using energy at an intensity of 3-5 kW/m³.

Generally the reaction time required for adequate carbonation is dependent on the dry matter content of the reaction mixture, the specific $CO_2$ addition rate and the degree and type of agitation: but with increasing dry matter content longer time is required for carbonation. With relation to the process of the invention it may be desirable to allow the carbonation reaction of process step i) to proceed for 30 minutes to 24 hours, such as from 1 to 20 hours, from 1 to 15 hours, from 1 to 10 hours, from 1 to 5 hours, from 1 to 3 hours, or such as from 2 to 20 hours, from 2 to 15 hours, from 2 to 10 hours or from 2 to 5 hours, or such as from 3 to 20 hours, from 3 to 15 hours, from 3 to 10 hours or such as from 1 to 6 hours. Using conventional low energy intensity reactors the applicant has achieved satisfactory carbonation using a reaction time of 30 minutes to 1 hour with reaction mixtures having a dry-matter content of approximately 5%. Likewise, using conventional low energy intensity reactors the applicant has achieved satisfactory carbonation using a reaction time of about 6 hours with reaction mixtures having a dry-matter content of approximately 18%

In further embodiments according to the invention, the carbonation of step i) is allowed to proceed for 5 minutes or more prior to addition of calcium oxide, lime or dry calcium hydroxide or said combination of any of the three in process step ii), such as for 10 minutes or more, for 15 minutes or more, for 20 minutes or more, for 30 minutes or more, for 1 hour or more, for 2 hours or more, for 3 hours or more, for 4 hours or more, for 5 hours or more, for 6 hours or more, or such as for 7 hours or more.

In order to endure completeness of the carbonation reaction it can be preferred to allow carbonation to proceed until reaching a pH of 8 or less at 25° C. Also, it may be preferred that the carbonation reaction in step 1 is allowed to continue until 10% or more of the calcium is in the form of calcium carbonate. This depends on the product type to be produced.

In primary embodiments of the invention the goal is to produce PCC without any substantial changes in the crystal morphology during the carbonation reaction. In these embodiments calcium oxide is added in amounts sufficient to maintain a surplus throughout the process.

It is within the scope of the present invention, however, to also operate the process of the invention such that the morphology of the calcium carbonate changes during the process. In particular the present process may be used e.g. for converting aggregated scalenohedral PCC to aggregated prismatic PCC. As previously suggested by Kroc et al., U.S. Pat. No. 5,695,733, this may be achieved by controlling the solution conductivity of the reaction mixture during the carbonation reaction. Accordingly, particular embodiments of the present invention provides a process comprising the use of a seed material of scalenohedral precipitated calcium carbonate and wherein said gas comprising carbon dioxide and said calcium oxide, lime or dry calcium hydroxide or said combination of any of the three are added in amounts and at rates which are adjusted so as to maintain the solution conductivity of the carbonation reaction of process step i) between 1.0 to 7.0 mS. In particular, it may be preferred to maintain the solution conductivity of the carbonation reaction of process step i) between 1.9 and 4.2 mS.

In applications where the process of the invention is used in order to alter the morphology of the PCC during the carbonation reaction such as taught U.S. Pat. No. 5,695,733 in it may be further preferred that the seed material of scalenohedral precipitated calcium carbonate has an average spherical diameter between 0.9 and 3.0 microns, such as from 0.9 to 2.0 microns. This seed material may be generated by carbonating an aqueous slurry of calcium hydroxide wherein the carbonation is started at a temperature between 18 and 52° C. Prior to carbonation, the calcium hydroxide may be screened in order to remove impurities and unslaked lime.

It is a further objective of the present invention to provide a process for increasing the dry-matter content of a precipitated calcium carbonate product prepared by carbonation of calcium hydroxide. The process comprises performing in parallel and in two or more separate reaction vessels the steps of:
  i) contacting calcium hydroxide with a gas comprising carbon dioxide to allow formation of calcium carbonate, and
  ii) adding calcium oxide, lime or dry calcium hydroxide or a combination of any of the three to a part of the resulting mixture of calcium hydroxide and calcium carbonate;
in such a way that continuous or non-continuous circulation between the two or more reaction vessels is allowed.

In accordance with the above description the process for increasing the dry-matter content of a precipitated calcium carbonate product preferably comprises adding lime, calcium oxide or dry calcium hydroxide or a combination of any of the three continuously or discontinuously to the carbonation reaction of process step i) via a recirculation loop.

As the process relies on addition of lime or calcium oxide or dry calcium hydroxide or a combination of any of the three as a means for increasing the content of solids in the resulting PCC product the process preferably does not involve a dewatering step to obtain the desired precipitated calcium carbonate or precipitated calcium carbonate solution.

In a second aspect the present invention provides a reactor system. In drawing 2 is shown the principles of a reactor system according to this aspect of the invention. As illustrated in the drawing the reactor system comprises:
  a) optionally a water inlet (C),
  b) a gas inlet (D), and
  c) a recirculation loop (E), comprising an inlet for addition of lime, calcium oxide, dry calcium hydroxide or a combination of any of the three (F) and, optionally, a water inlet (G).

In the reactor system illustrated in Drawing 2 the carbonation reaction is performed in a first or main reactor/reaction vessel (A), while calcium oxide, lime, dry calcium hydroxide or a combination of any of the three is added directly into the recirculation loop. Thus the drawing also illustrates a currently preferred embodiment in which the reactor system comprises a single reactor vessel being equipped with a recirculation loop.

A further embodiment relating to the design of the reactor system is illustrated in Drawing 3, in which the reactor system comprises two reactor vessels, a first reactor (A) and a second reactor (B) which are interconnected via a recirculation loop (E). Reaction vessel (B), which may be viewed as an integrated part of the recirculation loop, comprises an inlet for addition of lime, calcium oxide, dry calcium hydroxide or a combination of any of the three (F) and, optionally, a water inlet (G)

It is also within the scope of the present invention to provide reactor systems comprising more than two reactors or reaction vessels. In particular, one could contemplate a system in which precipitation of calcium carbonate occurs in two or more main reactors which are all connected to the same inlet for addition of calcium oxide, lime, dry calcium hydroxide or a combination of any of the three (F). In such a system, recirculation loops from the two or more main reactors would converge into one common second reaction vessel through which calcium oxide, lime, dry calcium hydroxide or a combination of any of the three could be added into the carbonation reactions occurring in the main reactors.

The reactor system according to the invention is particularly suitable for preparation of PCC in large scale and in preferred embodiments the volume of the main or first reaction vessel is therefore considerably larger than the volume of a typical high energy intensity reactor. According to these preferred embodiments the first reaction vessel (A) has a volume of 2-70 m$^3$, such as a volume of 3-70 m$^3$, of 4-70 m$^3$, of 5-70 m$^3$, of 7-70 m$^3$, of 10-80 m$^3$, of 15-90 m$^3$, of 20-95 m$^3$, of 25-100 m$^3$, of 30-110 m$^3$, of 40-125 m$^3$, or such as of 40-150 m$^3$.

Being considerable smaller than the main reaction vessel (A) the said second reactor preferably has a volume of from 50-1000 liters, such as of 100 liters or more, of 250 liters or more, of 500 liters or more, of 200 liters or more, of 750 liters or more, of 1000 liters or more, of 2000 liters or more, of 3000 liters or more, of 4000 liters or more, such as of 5000 liters or liters. Optionally, it can be equipped with forced mixing and/or forced recirculation.

A further aspect of the invention pertains to the use of a reactor system as described above for the production of precipitated calcium carbonate.

It should be noted that embodiments and features described in the context of one of the aspects of the present invention also apply to the other aspects of the invention.

Throughout the present specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All patent and non-patent references cited in the present application, are hereby incorporated by reference in their entirety.

The invention will now be described in further details in the following non-limiting examples.

EXAMPLES

PCC quality lime Leube AG from the quarry in Golling were used in all the following examples. In examples 1-8 the precipitation of PCC was performed in a pilot reactor system. The carbonation reactor had a total volume at 2 m$^3$ with a diameter at 1200 mm. Two agitators were placed on a shaft in the middle of the reactor. Both agitators had 6 hollow blades each. The shaft speed was 240 rpm. Gas was introduced through the bottom of the reactor. Liquid from the carbonation reactor was allowed to flow freely to a 1000 ltr. square container with agitation. A valve was inserted in between the two reactors in order to be able to stop the flow or to regulate the liquid flow. A frequency regulated pump was used to return the liquid to the carbonation reactor.

In examples 9 the precipitation of PCC was performed in a commercial reactor system. The carbonation reactor had a total volume at 50 m$^3$ with a diameter at 3500 mm. Two agitators were placed on a shaft in the middle of the reactor. Both agitators had 6 hollow blades each. The shaft speed was 82 rpm. Gas was introduced through the bottom of the reactor. Liquid from the carbonation reactor was allowed to flow freely to a 1000 ltr. tank with a conus. It was possible to add powder through a rotary valve to the 1000 ltr container. A valve was inserted in between the two reactors in order to be able to stop the flow or to regulate the liquid flow. A frequency regulated pump was used to return the liquid to the carbonation reactor.

In example 1-7, conductivity, pH, temperature, $CO_2$ content in and out of reactor as well as power input to the reactor were measured throughout the reaction, but not shown.

A sample from each reaction was also taken before CaO was added and the reaction was finalised, this sample showed that there were no changes of morphology after the lime had been added through the re-circulation loop. All samples have been analysed for the following parameters: solids, surface area (BET), particle size distribution (MPS) at a Sedigraph.

MPS, Sedigraph was measured on a Micromeritics Sedigraph 5100. Samples were prepared by adding an amount of the product corresponding to 4 g dry PCC to 60 ml of a 0.1% (w/v) sodium pyrophosphate solution. The suspension is dispersed for 3 minutes in a Polytron PT 3000/3100 at 15,000 rpm. Then it was submitted to ultrasound using an ultrasonic bath for 15 minutes and thereafter added to the mixing chamber of the Sedigraph.

Surface area (BET) was measured on a TriStar 3000 by measuring the nitrogen adsorption according to the BET procedure on a dried sample.

Solids were measured using a LP 16 infrared drying unit with a PE360 Mettler scale (accuracy 1 mg).

Viscosity was measured at a Brookfield type RVTDV-II viscometer.

A titration method has been used to determine how much of the $Ca(OH)_2$ was reacted to $CaCO_3$ at the time CaO addition started. 10 g of the partly carbonated solution was titrated with 1 M HCl using phenolphthalein as an indicator.

Example 1

Lime was prepared to produce an aggregated Schalenohedral PCC product. 1.5 m$^3$ $Ca(OH)_2$ was transferred to a PCC reactor at 14.3% solid $Ca(OH)_2$. Temperature was adjusted to 45° C. A gas containing 20% $CO_2$ was added at 370 Nm$^3$/h until pH had been below 8.0 for about 15 minutes. This means that practically all $Ca(OH)_2$ was precipitated as $CaCO_3$. A circulation between the PCC reactor and an external tank was started. The solution was allowed to flow freely from the PCC reactor to the external tank and was then pumped back to the PCC reactor. The flow rate through the re-circulation loop varied between 40 and 80 ltr/min depending on viscosity and the level in the external tank varied between 100 and 200 ltr. Lime was then added to the external tank until pH rose to above 11 (about 37 kg) and thereafter lime was added at a continuous pace at 3.2 kg/min until a total of 150 kg was added. When the reaction was almost finished the re-circulation was stopped and the external tank emptied to the reactor. Gas addition was stopped when the pH had been below 8 for about 15 minutes.

The final PCC was an aggregated S-PCC with a median particle size at 2.9 μm, a specific surface area (BET) at 4.2 m$^2$/g, Brookfield viscosity at 22 cp and solids at 31%.

Example 2

Lime was prepared to produce a colloidal PCC product. 1.5 m$^3$ $Ca(OH)_2$ was transferred to a PCC reactor at 16.2% solid $Ca(OH)_2$. Temperature was adjusted to 11° C. A gas containing 19% $CO_2$ was added at 270 Nm$^3$/h. When 80% of the $Ca(OH)_2$ was changed to $CaCO_3$ then re-circulation was started using the same parameters as in example 1 and CaO was added to the re-circulation tank. The first 18 minutes 2.5 kg CaO was added and 3 kg was added for another 37 minutes. In total 156 kg CaO was added. Gas addition was continued. When the reaction was almost finished the re-circulation was stopped and the external tank emptied to the reactor. Gas addition was stopped when the pH had been below 8 for about 15 minutes.

The final PCC was a colloidal with a median particle size at 3.1 µm, a specific surface area (BET) at 17.4 m$^2$/g, Brookfield viscosity at 41 cp and solids at 35%.

Example 3

Lime was prepared to produce a colloidal PCC. 1.5 m$^3$ Ca(OH)$_2$ was transferred to a PCC reactor at 15.6% solid Ca(OH)$_2$. Temperature was adjusted to 11° C. A gas containing 19% CO$_2$ was added at 270 Nm$^3$/h. When 40% of the Ca(OH)$_2$ was changed to CaCO$_3$ then re-circulation was started using the same parameters as in example 1 and CaO was added to the re-circulation tank. 5 kg CaO/min was added for 16 minutes to the re-circulation tank. In total 80 kg CaO was added. When CaO addition was finalized re-circulation was stopped and the external tank emptied to the reactor. Immediately after the re-circulation loop was emptied then the reactor content was cooled to 21° C. Gas addition was stopped when the pH had been below 8 for about 15 minutes.

The final PCC was colloidal PCC with a median particle size at 1.94 a specific surface area (BET) at 18.5 m$^2$/g, Brookfield viscosity at 41 cp and solids at 24%.

Example 4

Lime was prepared to produce an aragonitic PCC product. 1.5 m$^3$ Ca(OH)$_2$ added 2.5% aragonitic seeds were transferred to a PCC reactor at 8.2% solid Ca(OH)$_2$. Temperature was adjusted to 55° C. Re-circulation of reactor content was started. The flow rate through the re-circulation loop varied between 40 and 80 ltr/min depending on viscosity and the level in the external tank varied between 25 and 100 ltr. A gas containing 6% CO$_2$ was added at 100 Nm$^3$/h for the first 15 minutes. Then the gas was changed to 15% CO$_2$ and 225 Nm$^3$/h. When the conductivity started to drop at the end of the reaction then CaO was added to the re-circulation loop at a rate to keep conductivity (non temperature compensated) at 2.5 mS/cm. In total 75 kg of CaO was added. When the addition of CaO was finished then the recirculation loop was emptied into the reactor and the reaction was allowed to finish. Gas addition was stopped when the pH had been below 8 for about 15 minutes.

The final PCC was aragonitic PCC with a median particle size at 2.05 µm a specific surface area (BET) at 7.5 m$^2$/g, Brookfield viscosity at 370 cp and solids at 16%.

Example 5

Lime was prepared to produce an aggregated Schalenohedral PCC product. 1.5 m$^3$ Ca(OH)$_2$ was transferred to a PCC reactor at 13.5% solid Ca(OH)$_2$. Temperature was adjusted to 45° C. A gas containing 20% CO$_2$ was added at 277 Nm$^3$/h. After 15 minutes circulation between the PCC reactor and an external tank was started as described in example 1. When 95% of the Ca(OH)$_2$ had been reacted to CaCO$_3$, lime was added to the re-circulation tank at a continuous pace at 2.5 kg/min the first 20 minutes and 3 kg for the following 37 minutes until a total of 160 kg was added. When the reaction was almost finished the re-circulation was stopped and the external tank emptied to the reactor. Gas addition was stopped when the pH had been below 8 for about 15 minutes.

The final PCC was an aggregated S-PCC with a median particle size at 3.1 µm, a specific surface area (BET) at 3.5 m$^2$/g, Brookfield viscosity at 55 cp and solids at 32%.

Example 6

Lime was prepared to produce a discrete rhombohedral PCC product. 1.5 m$^3$ Ca(OH)$_2$ was transferred to a PCC reactor at 15% solid Ca(OH)$_2$. Temperature was adjusted to 11° C. A gas containing 19% CO$_2$ was added at 270 Nm$^3$/h. When 80% of the Ca(OH)$_2$ had reacted to CaCO$_3$ then re-circulation was started using the same parameters as in example 1 and CaO was added to the re-circulation tank. 2.5 kg CaO/min was added to the re-circulation tank for 60 minutes. In total 150 kg CaO was added. Gas addition was continued. When the reaction was almost finished the re-circulation was stopped and the external tank emptied to the reactor. Gas addition was stopped when the pH had been below 8 for about 15 minutes.

The final PCC was a discrete Rhombohedral PCC with a median particle size at 2.21 µm, a specific surface area (BET) at 4.5 m$^2$/g, Brookfield viscosity at 130 cp and solids at 31%.

Example 7

Lime is prepared to produce an aggregated Schalenohedral PCC product. 1.5 m$^3$ Ca(OH)$_2$ is transferred to a PCC reactor at 13.5% solid Ca(OH)$_2$. Temperature is adjusted to 45° C. A gas containing 20% CO$_2$ is added at 277 Nm$^3$/h. After 15 minutes circulation between the PCC reactor and an external tank is started as described in example 1. When 95% of the Ca(OH)$_2$ has been reacted to CaCO$_3$, lime is added to the re-circulation tank at a continuous pace at 3 kg/min. After 40 minutes anionic polymer (0.5% w/w) is added to the recirculation tank. The addition of CaO is continued for 65 minutes. Thereby a total of 315 kg CaO is added. When the reaction is almost finished the re-circulation is stopped and the external tank emptied to the reactor. Gas addition is stopped when the pH had been below 8 for about 15 minutes.

The final PCC is an aggregated S-PCC with a median particle size at 3.6 µm, a specific surface area (BET) at 2.4 m$^2$/g, Brookfield viscosity at 450 cp and solids at 55%.

Example 8 pH stability of the product from example 5 is tested at 20° C. and 60° C., by transferring 1 ltr to a water bath and leave it stirring gently. Another PCC batch is produced according to the conditions described in example 5, but without adding any CaO to the re-circulation loop, end solids of this batch is 17% (batch 5A). pH stability is also tested for batch 5A. Batch 5A is concentrated to 31% solids using a decanter (batch 5B). Again, the pH stability is tested. pH stability for the product from example 5 and 5A is similar, whereas the pH is considerable higher after concentration and it is also rising at a higher pace. It can also be observed that the 75/25 ratio for batch 5 is lower than 5A which again is lower than 5B showing that the steepness of the particle size distribution is lower for 5B than for 5A which again is lower than the steepness in the particle size distribution for batch 5.

Example 9

Lime is prepared to produce an aggregated Schalenohedral PCC product. 35 m$^3$ Ca(OH)$_2$ is transferred to a PCC reactor at 15% solid Ca(OH)$_2$.

Temperature is adjusted to 46° C. A circulation between the PCC reactor and an external tank was started. The solution is allowed to flow freely from the PCC reactor to the external tank and is then pumped back to the PCC reactor. The flow rate through the re-circulation loop is about 70 m$^3$/h. The amount in the external tank was kept at 500 kg. A gas containing around 20% $CO_2$ is added at around 5500 Nm$^3$/h. When 95% of the $Ca(OH)_2$ is precipitated as $CaCO_3$. Lime is then added to the external tank until at 1.7 tonne/min until a total of 4.7 tonne is added. When the reaction is finished the re-circulation was stopped and the external tank emptied to the reactor. Gas addition is stopped when the pH had been below 8 for about 10 minutes.

The final PCC was an aggregated S-PCC with a median particle size at 2.5 μm, a specific surface area (BET) at 5.3 m$^2$/g, Brookfield viscosity at 150 cp and solids at 35%. The agitation takes around 3.2 kW/m$^3$.

The invention claimed is:

1. A process for production of precipitated calcium carbonate by carbonation of calcium hydroxide, comprising performing in two or more separate reaction vessels the steps of:
   i) contacting calcium hydroxide with a gas comprising carbon dioxide to allow formation of calcium carbonate in a first reaction vessel, and then
   ii) transferring a part of the calcium hydroxide and calcium carbonate to a second reaction vessel; and then
   iii) adding calcium oxide, lime or dry calcium hydroxide or a combination of any of the three to the calcium hydroxide and calcium carbonate in the second reaction vessel to form a precipitated calcium carbonate; and then
   iv) transferring the precipitated calcium carbonate back to the first reaction vessel in a continuous or non-continuous manner.

2. The process according to claim 1, wherein said calcium oxide, lime or dry calcium hydroxide or said combination of any of the three is added continuously to the carbonation reaction in process step i) via a recirculation loop.

3. The process according to claim 2, wherein said recirculation loop is equipped with a cooling device, a heat exchanging device or a heating device.

4. The process according to claim 1, wherein the process does not involve a dewatering step to obtain the desired precipitated calcium carbonate or precipitated calcium carbonate solution.

5. The process according to claim 1, wherein the carbonation reaction of step i) is started at a temperature between 5 and 100° C.

6. The process according to claim 1, wherein steps i) and ii) are performed in reaction vessels that are interconnected via a recirculation loop.

7. The process according to claim 1, wherein the gas comprising carbon dioxide in process step i) has a carbon dioxide content of from 5-35%.

8. The process according to claim 1, wherein the amount of carbon dioxide in step i) corresponds to a gas volume per reactor volume per minute of from 2-5.

9. The process according to claim 1, wherein the calcium oxide, lime and/or the dry calcium hydroxide added, and/or the calcium hydroxide has a particle size of 15 mm or less.

10. The process according to claim 1, said process comprising the addition of one or more components having the ability of lowering the viscosity in the reaction and in the final product.

11. The process according to claim 1, wherein the content of said reaction vessels is mixed using an energy intensity of 50 kW/m$^3$ or less.

12. The process according to claim 1, wherein the carbonation reaction of process step i) is allowed to proceed for 30 minutes to 24 hours.

13. The process according to claim 1, wherein the carbonation of step i) is allowed to proceed for 5 minutes or more prior to addition of calcium oxide, lime or dry calcium hydroxide or said combination of any of the three in process step ii).

14. The process according to claim 1, wherein addition of calcium oxide, lime or dry calcium hydroxide or a combination of any of the three is commenced when the conductivity of the carbonation reaction in process step i) reaches a value below 8 mS at 25° C.

15. The process according to claim 1, wherein the carbonation is allowed to proceed until reaching a pH of 8 or less at 25° C.

16. The process according to claim 1, wherein the carbonation at step i) is allowed to continue until 10% or more of the calcium is in the form of calcium carbonate.

17. A process for increasing the dry-matter content of a precipitated calcium carbonate product prepared by carbonation of calcium hydroxide, said process comprising performing in two or more separate reaction vessels the steps of:
   i) contacting calcium hydroxide with a gas comprising carbon dioxide to allow formation of calcium carbonate in a first reaction vessel, and then
   ii) transferring a part of the calcium hydroxide and calcium carbonate to a second reaction vessel; and then
   iii) adding calcium oxide, lime or dry calcium hydroxide or a combination of any of the three to the calcium hydroxide and calcium carbonate in the second reaction vessel to form a precipitated calcium carbonate; and then
   iv) transferring the precipitated calcium carbonate back to the first reaction vessel in a continuous or non-continuous manner; and
   v) determining the dry-matter content of the precipitated calcium carbonate product.

18. The process according to claim 17 comprising adding calcium oxide, lime or dry calcium hydroxide or a combination of any of the three continuously or discontinuously to the carbonation reaction of process step i) via a recirculation loop.

19. The process according to claim 17, wherein the process does not involve a dewatering step to obtain the desired precipitated calcium carbonate or precipitated calcium carbonate solution.

* * * * *